M. O. CHAFFEE.
TRACTOR HITCH.
APPLICATION FILED JULY 27, 1920.
1,427,066.
Patented Aug. 22, 1922.
5 SHEETS—SHEET 3.
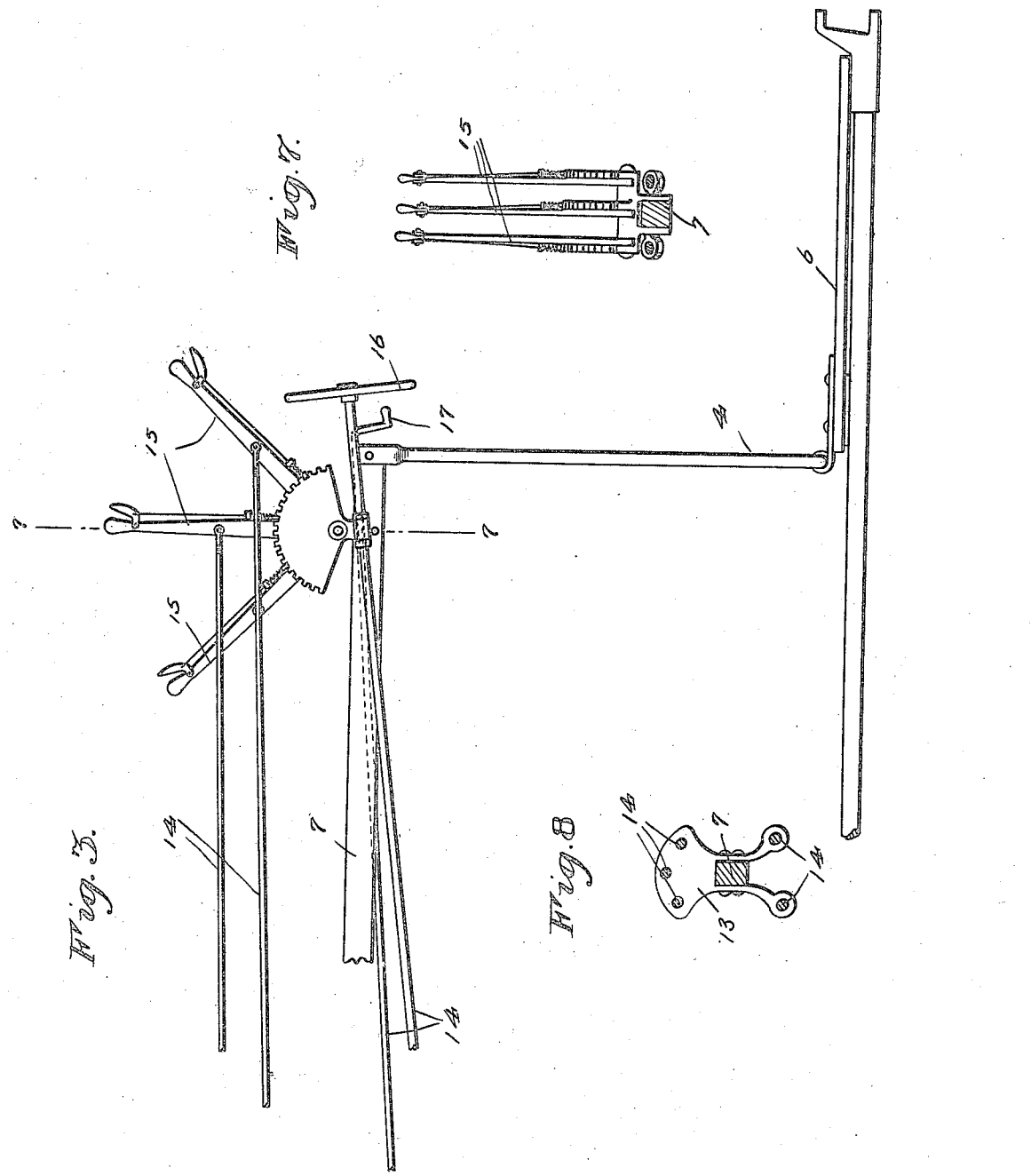
M. O. Chaffee INVENTOR
BY Victor J. Evans
ATTORNEY
R. A. Thomas
L. B. Middleton
WITNESSES

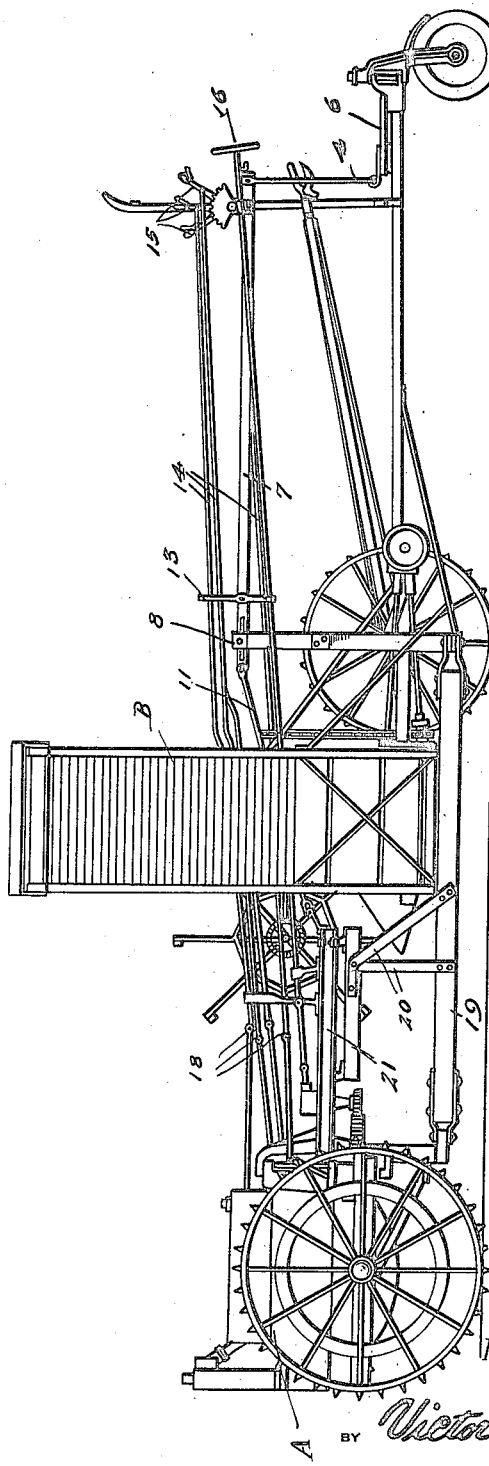

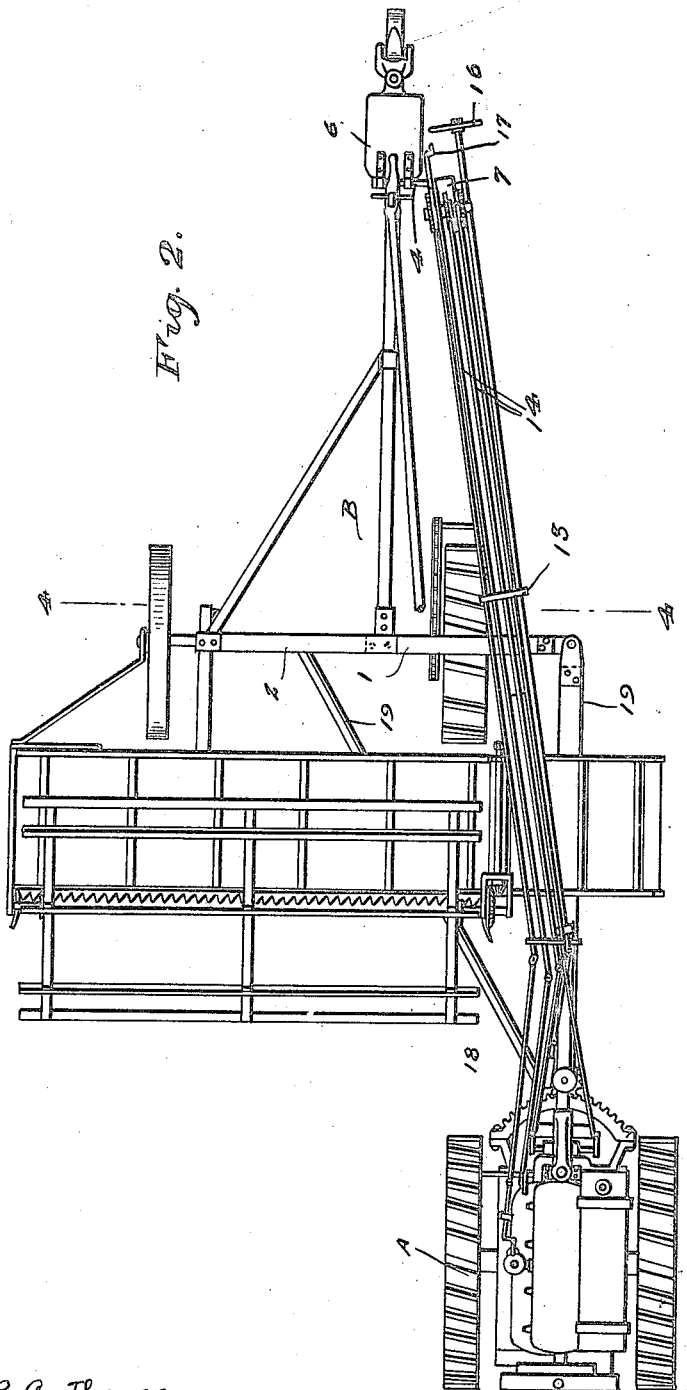

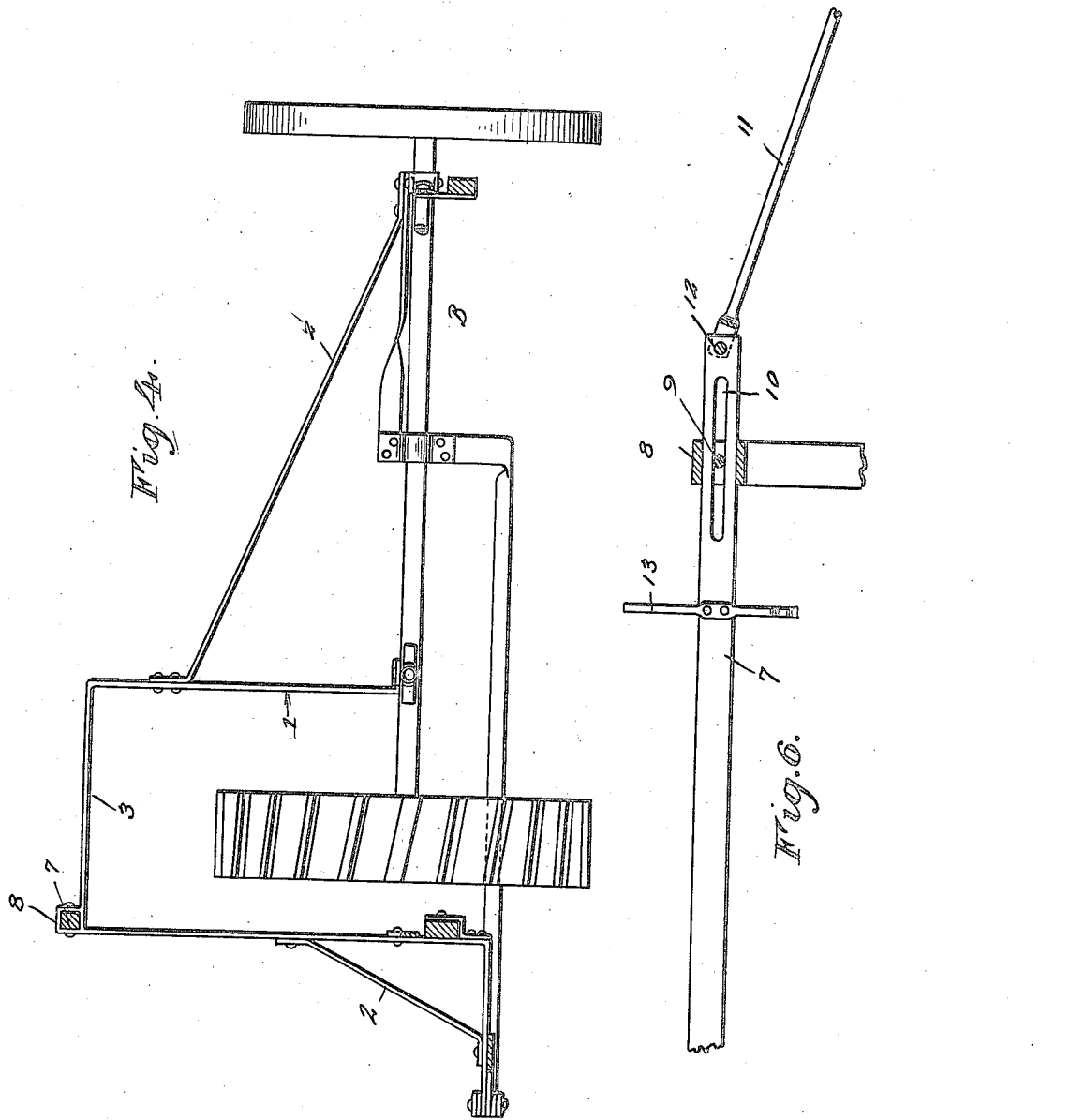

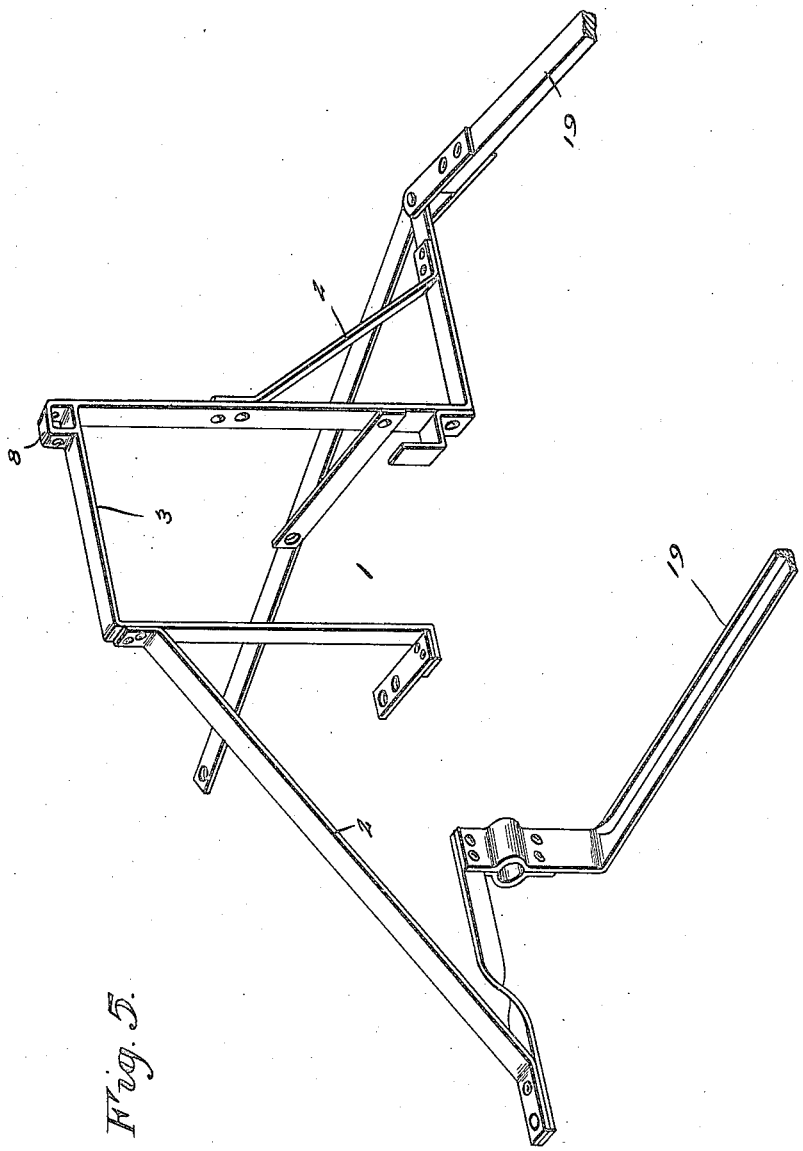

UNITED STATES PATENT OFFICE.

MILO O. CHAFFEE, OF SANFORD, KANSAS.

TRACTOR HITCH.

1,427,066.    Specification of Letters Patent.    Patented Aug. 22, 1922.

Application filed July 27, 1920. Serial No. 399,221.

*To all whom it may concern:*

Be it known that I, MILO O. CHAFFEE, a citizen of the United States, residing at Sanford, in the county of Pawnee and State of Kansas, have invented new and useful Improvements in Tractor Hitches, of which the following is a specification.

This invention relates to a tractor hitch and the principal object of the invention is to provide means for steering the tractor and controlling the speed of the same from the operator's platform of a header.

Another object of the invention is to so attach the improvement to the header that it will not be necessary to drill holes in the header or to alter the header in any manner.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a side view of a tractor and header showing my invention in use.

Figure 2 is a plan view of Figure 1.

Figure 3 is an enlarged detail view of the tractor controlling part of the operator's platform.

Figure 4 is a cross section through the header taken on line 4—4 of Figure 2.

Figure 5 is a view of the supporting frame carried by the header.

Figure 6 is a detail view showing how the brace rod is connected with the end of the connecting beam.

Figure 7 is a detail sectional view taken on line 7—7 of Figure 3.

Figure 8 is a detail view of the bracket 13.

In these views A indicates the tractor and B the header. In carrying out my invention I provide an upright frame 1 which has portions thereof secured to the axle of the header and other parts to the frame of the header. This upright frame is also braced by the braces 2 which are supported by various parts of the frame of the header. A part of the upright frame is of substantially U-shape as shown at 3 and this U-shaped part receives a portion of the bull wheel of the header. A bracket 4 is placed on the operator's platform 6 of the header and one end of a beam 7 is connected to the upper part of the bracket. The other end of the beam passes through a socket 8 formed on the top of the U-frame 3 and is held in said socket by a bolt 9 passing through a slot 10 formed in the beam. A brace rod 11 has one end engaging a hole 12 formed in the end of said beam, adjacent the slot, and the lower end of said brace rod is suitably secured to a part of the header frame. Guides 13 are formed on the beam for supporting the controlling rods 14 which are connected with the steering mechanism, the throttle, the gear shift, the clutch and the brake. The rods controlling the gear shift, the clutch and brakes are connected with the hand levers 15 which are connected with a part of the bracket 4 while the steering rod is provided with a steering wheel 16 and the throttle rod with the crank arm 17. Where necessary the rods may be provided with the universal joints 18.

The tractor is attached to the front of the header frame by the angle frame 19 which is connected with the drawbar of the tractor at its apex. This angle frame carries the upright frame 20 which is connected with the tractor by the bars 21.

By my invention one man may control both the tractor and the header from the operator's platform and the device enables the header to be run backwards. The tractor can be connected with the header or disconnected from the same very easily and quickly.

In hitching four wheel tractors to the header the control rods should each have a hinge directly over the drawbar coupling to enable the tractor to turn and there should be a brace bolted onto the header hitch at about the point of the drawbar coupling with holes therein for the control rods to pass through. These hinges and brace are not required for the two-wheel tractors, such as shown in the drawings, as the rods are connected with the tractor just above the drawbar hitch.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

The combination with a header and a tractor connected thereto at the front end thereof, an upright frame having portions thereof secured to the axle of the header, brace rods adapted to brace said frame, said upright frame being of substantially U-shape to receive a portion of the bull wheel of the header, a bracket located on the operator's platform of the header and a slotted beam connected to the upper part of the bracket, the other end of the beam passing through a socket formed on the top of the U-frame, a brace rod having one end engaging a hole formed in the end of said beam adjacent the slot and the lower end of said brace rod suitably secured to a part of the header frame, controlling rods connected to the steering mechanism and guides formed on the beam for supporting said rods, hand levers connected to said rods and said levers being connected with a part of said bracket, an angle frame connecting the tractor to the front of the header frame and an upright frame carried by said angle frame, bars connecting said upright frame with the tractor.

In testimony whereof I affix my signature.

MILO O. CHAFFEE.